Patented July 26, 1938

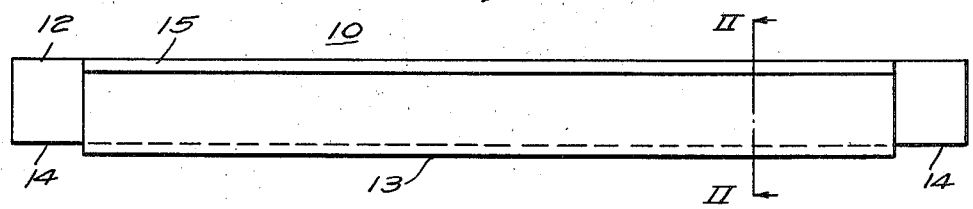
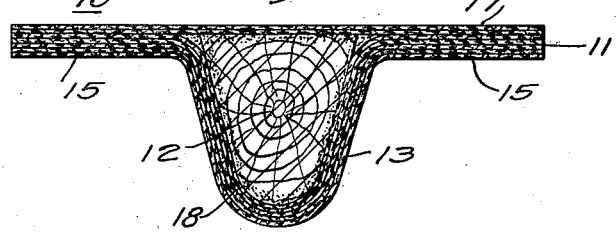
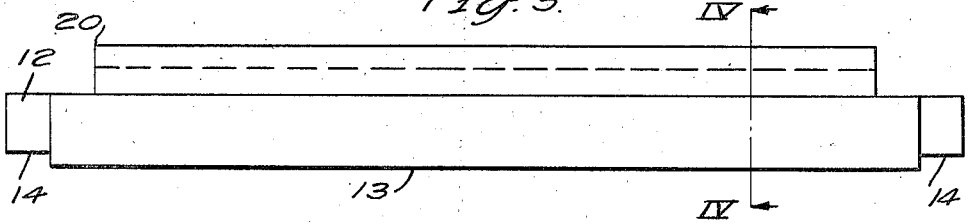
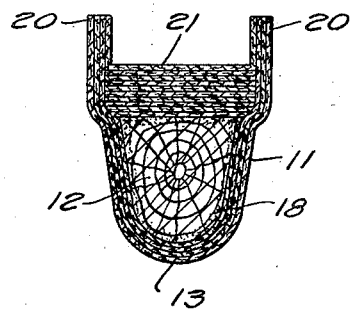

2,125,092

UNITED STATES PATENT OFFICE 2,125,092

INSULATED RUNNER FOR TROLLEY DEVICES

Nils A. Wahlberg, Wilkinsburg, Pa., assignor to Westinghouse Electric & Manufacturing Company, East Pittsburgh, Pa., a corporation of Pennsylvania Application July 31, 1937, Serial No. 156,783

12 Claims. (Cl. 191—39)

My invention refers generally to devices for use in overhead trolley systems, and it has reference in particular to an insulating runner member for use with section insulators, insulating spacer members or the like, in overhead trolley systems.

In overhead trolley systems it has often been found necessary to provide insulating members in the overhead system, either for the purpose of sectionalizing adjacent portions of the trolley wire, or to facilitate providing a smooth junction of trolley wires of opposite polarity, such as at crossings, turnouts, and the like.

Such insulating members will generally be subjected to the full mechanical strain of the overhead system, which, in many instances, may be in excess of 3,000 pounds. It may, therefore, be seen that such members must not only have good insulating qualities and be of durable construction, but have high tensile strength, and they are, therefore, usually constructed so as to have a main body portion which will withstand the pull of the trolley wire, and a renewable runner member to provide a wearing portion to aid in the guiding of the current collector thereover. By these provisions the strength of the body member may be made independent on the runner portion and unaffected by wear incurred by passage of current collectors thereover, thus reducing the possibility of failures of the body member.

Inasmuch as the runner portion is not only subjected to direct wear through the passage of the current collector, but is additionally subjected to the destructive effects of arcs drawn by the current collector in passing from the live portion of the trolley wire to the insulated runner member, it has always been difficult to provide a runner member which will stand up under such severe service. As the runner member must also be exposed to extreme weather conditions, the selection of materials for such a runner member and its design are further complicated.

It has heretofore been customary to use insulating runner members of treated wood, fibre, or rubber compositions. While runner members of wood have proven reasonably cheap, and when properly impregnated will stand up reasonably well under adverse weather conditions, they are easily burnt or charred by arcs drawn by the current collector, and cannot withstand the continual wear of passing current collectors. Fibre runner members, while withstanding reasonable wear and arcing, have proven extremely unsatisfactory when exposed for any time to moisture. In installations where a relatively high humidity is common, it has been found that fibre members soon begin to absorb moisture, warp, and become so distorted that they cannot be used. Runner members of rubber compositions, while readily withstanding wear and weather conditions, are expensive and prone to char under the extreme arcing conditions to which they are subjected, soon losing their desirable insulating qualities.

To prevent the body member of a section-insulator, spacer member, or the like, from being damaged by arcs drawn by passing current collectors, it has heretofore been customary to utilize arc shield members which deflect the arc from the body of the insulating device. In many such applications, separate shield members have been provided, requiring individual attaching means to secure them in position, or else they have been sandwiched between the runner member and body member and held in position by the runner member and its securing means. Fibre shields have been thus utilized to a large extent but it has been found that the effects of exposure to heat and moisture are so harmful in warping a fibre shield, particularly when it is a separate member, that it soon becomes damaged beyond use, and may in some instances buckle so badly that it distorts the runner member, requiring its removal also.

It is, therefore, generally an object of my invention to provide an insulating runner member for trolley fixtures, having an integral laminated runner portion and arc shield member.

A more specific object of my invention is to provide a lightweight rigid insulating runner member and an arc shield member integrally molded of a heat resistant fibrous material impregnated with a synthetic resin.

Another object of my invention is to provide a renewable insulating runner member for trolley fixtures having a central reinforcing core molded within an integral laminated runner member and arc shield member.

Still another object of my invention is to provide an integral runner member and arc shield member molded of a non-charring fibrous material, wherein the runner member and arc shield member mutually reinforce each other to provide a rigid unitary construction.

A further object of my invention is to provide a combination molded insulating runner member and arc shield member for overhead trolley fixtures which shall be of simple construction and economical to manufacture, easy to install, and unaffected by heat, moisture and wear.

My invention, accordingly, is disclosed in the embodiments thereof shown in the accompanying drawing, and comprises the features of construction, combination of elements, and arrangement of parts which will be exemplified in the construction hereinafter set forth, and the scope of the application of which will be indicated in the appended claims.

In the preferred embodiment of my invention, an insulating runner member for use with overhead trolley devices may be provided by combining an insulating wear surface with a central reinforcing core member. The wear surface may comprise a plurality of laminations of a fibrous, heat-resisting material, such, for example, as a material containing asbestos, impregnated with a synthetic resin and disposed about the core member. When placed in a suitable mold, these members may be molded by applying heat and pressure to form a wear surface and arc shield flanges to the desired shape, whereby the wear surface, arc shield flanges and core member will become integrally combined through diffusion of the synthetic resin throughout the fibrous material and its penetration into the core member.

For a more complete understanding of the nature and scope of my invention, reference may be had to the accompanying drawing, in which:

Figure 1 is a side elevation view of a preferred form of insulating runner embodying my invention;

Fig. 2 is an enlarged sectional view of the runner member of Fig. 1, taken along the line II—II;

Fig. 3 is a side elevation view of an alternate form of runner member; and,

Fig. 4 is an enlarged sectional view of the runner member of Fig. 3, taken along the line IV—IV.

Referring more particularly to Fig. 1, the reference numeral 10 denotes, generally, a renewable insulating runner member for use with an overhead trolley device, such as a section insulator, or insulating spacing member (not shown) but well known in the art. To provide a durable insulating wear surface for the runner member 10, a plurality of laminations of heat-resisting fibrous material 11 may be shaped about a central core member 12, which is adapted to provide a forming and reinforcing member for a runner portion 13 and have extending end portions 14 by which the runner member may be secured in operating position with the device with which it is adapted to be used. In general, the laminations 11 may function not only to provide a wear surface for the runner portion 13, but may additionally form laterally extending arc shield flanges 15 along either side of the runner member 13 to prevent damage to the body member of the device with which the runner member may be used, by deflecting away from the body member arcs drawn by passing current collectors.

By utilizing laminations of heat-resisting fibrous material 11 to form the wearing surface 13 and arc shield flanges 15, a rigid unitary construction may be secured, wherein the runner member 13 and arc shield flanges 15 mutually reinforce each other. There may further be provided a backing strip 17, likewise comprising impregnated laminations of a fibrous material, adapted to be associated with the arc shield flanges 15. By subjecting the combination of core member 12, wearing surface 13, arc shield flanges 15 and backing strip 17 to suitably applied heat and pressure in a mold, penetration into the core member 12 of the synthetic resin with which the laminations of fibrous material are impregnated, may, as shown by the stippled portion 18 in Figs. 2 and 4, be utilized to unite the members and provide an integral member which is heat, moisture and wear resistant to a high degree.

Referring to Figs. 3 and 4, which show an alternate form of insulating runner member, it may be seen that the laminations 11, instead of being adapted to form integral laterally extending arc flanges, as in Figs. 1 and 2, may be extended upwardly to provide side flanges 20, which are disposed to extend upwardly about the body member of the section insulator or spacing member with which the runner member is used. Additional laminations of a fibrous material may be used to provide a backing strip 21, associated with the side flanges 20 and core 12, thus not only reinforcing the flanges 20, but further assisting in providing arc shield protection for the body member, and maintaining engagement and alinement of the runner member 10 with the body member of the trolley device with which it is used.

It may, therefore, be seen that by my invention I have provided a runner member not only of great strength but also of high heat resistant qualities. By utilizing a core member which may have great strength yet lack the desirable heat resistant or weather resistant qualities, and combining it with a wearing surface having heat, wear and weather resistant qualities, the desired combination of qualities for an ideal insulating runner member may be secured. A suitable runner member is thereby provided which is not only inexpensive and easy to manufacture, but is light in weight, has high dielectric strength, and is highly resistant to both mechanical wear and arcing.

Since certain changes may be made in the above construction, and different embodiments of the invention may be made without departing from the spirit thereof, it is intended that all matter contained in the foregoing description or shown in the accompanying drawing shall be considered as illustrative, and not in a limiting sense.

I claim as my invention:

1. An insulating runner member for a trolley device comprising, in combination, a runner portion, a core member within the runner portion, and flanged arc-shield members molded integrally with the runner portion.

2. In a trolley fixture, in combination, an insulating runner member, a central core member molded therein, and flanged arc-shield members molded integral with the runner member.

3. In an insulating runner member for a trolley fixture, in combination, a flanged arc-shield member, a central longitudinal rib portion integrally molded on one side of the flanged member to provide a runner portion and reinforce the arc shield member, and a forming member molded within the runner portion.

4. A runner member for a trolley fixture comprising a longitudinal rib portion of fibrous material impregnated with a resinous binder and disposed to provide a wearing surface for a current collector, flanged arc-shield members molded integral with said rib portion, and a reinforcing core member disposed within said rib portion, said binder penetrating the reinforcing core to provide a unitary member.

5. A runner member for a trolley fixture, comprising, a core member, a plurality of laminations of fibrous material impregnated with a resinous binder disposed to be molded about the core to provide a longitudinal runner portion having flanged arc-shield members integral therewith, the binder penetrating the core member to unite the runner portion and core member.

6. An insulating runner member for an overhead trolley device, comprising the combination of, a lightweight forming member, and a plurality of laminations of fibrous heat resistant material impregnated with a synthetic resin binder molded about the forming member to provide a central runner portion and lateral arc-shield flanges integral therewith, the binder penetrating the forming member to provide a unitary construction.

7. A unitary runner member for a trolley fixture, comprising, a forming member, a plurality of laminations of fibrous insulating material impregnated with a synthetic resin molded about the forming member to provide a central runner portion having integral arc-shield flanges, and a backing strip of fibrous material molded in association with said flanges, the synthetic resin penetrating the forming member and backing member to form an integral structure.

8. An insulating runner member for a trolley fixture, comprising the combination of, a central reinforcing member adapted to provide a forming core for a runner portion, a plurality of laminations of fibrous material impregnated with a resinous binder molded about the reinforcing member to provide an insulating runner portion having lateral flanges integral therewith, and a backing strip of fibrous material molded in engagement with said flanges and reinforcing member, the binder penetrating the reinforcing member and backing strip to unite them integrally with the flanged runner portion.

9. In a renewable insulating runner member for trolley fixtures, the combination comprising a longitudinal fibrous forming member, an insulating wearing surface comprising a plurality of laminations of fibrous heat resistant material impregnated with a binder of phenolic condensate molded about the forming member to provide a runner portion with lateral arc shield flanges integral therewith, and a backing member of fibrous material molded in association with the forming member and arc shield flanges, the binder penetrating the forming member and backing member to unite them integrally with the runner portion and arc-shield flanges.

10. A replaceable runner member for trolley fixtures comprising, a reinforcing core, a plurality of laminations of fibrous material impregnated with a binder of synthetic resin molded about said core to provide a central runner portion having integral arc-shield flanges along each side thereof, and additional laminations of fibrous material impregnated with a synthetic resin molded integrally with and in the plane of said flanges, the synthetic resin penetrating the core to unite said laminations and core in a unitary structure.

11. A unitary construction for a renewable insulating runner member for overhead trolley fixtures, comprising, the combination of, a longitudinal fibrous forming member, a longitudinal insulating wearing surface of a fibrous heat resistant material impregnated with a synthetic binder resin molded about the forming member to provide an insulating runner portion, upstanding lateral arc-shield flanges disposed to disperse an uprising electric arc molded integrally with the runner portion and adapted to be positioned about the body of a trolley fixture, and a laminated backing strip impregnated with synthetic binder resin molded integrally with said arc-shield flanges and forming member, the binder resin penetrating the forming member to provide a light, strong and durable unitary structure.

12. In an insulating runner member, the combination of, a longitudinal reinforcing member, and an integral runner member and arc shield member comprising a plurality of laminations of fibrous material impregnated with a resinous binder and molded about the reinforcing member in continuous relation to provide mutually reinforcing runner and arc shield members.

NILS A. WAHLBERG.